March 30, 1971 C. L. LEVESQUE Re. 27,107

DRUG COMPOSITION

Original Filed Oct. 10, 1958 2 Sheets-Sheet 1

INVENTOR
Charles L. Levesque
BY Paul L. Adams
ATTORNEY

INVENTOR
Charles L. Levesque
BY Paul L. Abbott
ATTORNEY

United States Patent Office

Re. 27,107
Reissued Mar. 30, 1971

27,107
DRUG COMPOSITION

Charles L. Levesque, Philadelphia, Pa., assignor to Rohm & Haas Company, Philadelphia, Pa.

Original No 2,987,455, dated June 6, 1961, Ser. No. 766,496, Oct. 10, 1958. Application for reissue May 1, 1968, Ser. No. 728,092
Int. Cl. A61j *3/10;* A61k *9/00, 27/12*
U.S. Cl. 424—22 32 Claims

Matter enclosed in heavy brackets [ ] appears in the original patent but forms no part of this reissue specification; matter printed in italics indicates the additions made by reissue.

*ABSTRACT OF THE DISCLOSURE*

*A composition in oral dosage form, and method of making same, comprising a particular porous plastic matrix and a water soluble drug dispersed in said matrix.*

This invention relates to a new drug composition and a method for the administration of drugs. More particularly, the invention relates to a new composition of a drug dispersed in plastic and suitable for oral administration.

It has always been recognized in the medical art that the administration of drugs by the oral route is to be preferred and in recent years more and more emphasis has been placed on the oral administration of drugs. There are reasons why many drugs cannot be administered satisfactorily in their simplest form. For example, the drug may be irritating to the gastro-intestinal tract and particularly to the stomach. Secondly, it may be destroyed in the stomach. Thirdly, it may be too readily absorbed with the consequent danger from toxic dosage, or it may be too readily excreted and pass out of the body before the therapeutic effect can be realized.

Numerous attempts have been made to provide a dosage form which will solve the foregoing problems but up to the present time none of these has proven entirely satisfactory. For example, enteric coatings have been applied for many years to a wide variety of drugs in an attempt to protect the drug from gastric secretions, or to protect the stomach from the harsh effect of the drug. Enteric coatings have employed many kinds of materials and all are designed to be resistant to gastric secretions, but must be readily disintegrated in the intestinal tract in order for the drug to become effective. In every instance the enteric coating is designed to be destroyed or broken up in the intestinal tract. Enteric coatings as a class depend upon some type of chemical action or reaction for their disintegration.

Another class of protective coating for medicaments is the type known as time-disintegration coatings. In these coatings a class of materials is used which is dissolved or disintegrated slowly as the tablet passes through the stomach and intestine, and an amount of coating is used which is designed to allow release of the drug after a certain period of time in the body. Due to the tremendous differences in the operation of the gastro-intestinal mechanism in different persons the time-disintegration coating does not work the same way in every person but rather is designed to give results based on the mechanism of the average individual.

A variation of the time-disintegration dosage form just described is one in which particles of a medicament are coated with a varying number of layers of a material which will be slowly washed away or destroyed by the gastro-intestinal fluids. In such a dosage form a portion of the drug has little or no coating for initial response, thin coatings are used for a quick follow-up response and thicker coatings are used for a delayed response.

Time-disintegration coatings as a class depend for their disintegration upon the effects of agents found in the gastro-intestinal fluids. The enzymes, fat-solubilizers and emulsfiers in these fluids hasten the breaking-up or wearing-away of the coatings.

It is a principal object of the present invention therefore to provide an orally effective dosage form in which the drug will be slowly but uniformly released in the body.

Another object of the invention is to provide a dosage form which will release an effective amount of the drug within a short time after ingestion and which will continue to release the drug over an extended period of time.

A further object of the invention is to provide an oral dosage form from which the drug will be slowly released by a substantially physical process of dissolving drug out of a solid, inert body independently of the digestive process.

Other objects and many of the inherent advantages of the present invention will be more readily appreciated by reference to the following description when considered in connection with the accompanying drawings wherein.

Figure 3:
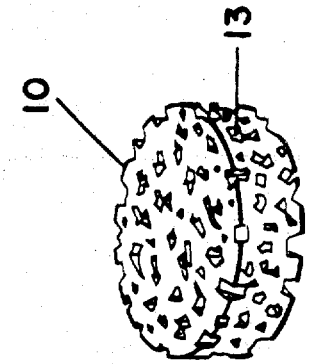
FIGURE 3 is a schematic drawing of a completely leached tablet showing the plastic carrier 10 which remains intact and the cavities 13 from which the drug has been leached.
Figure 2:
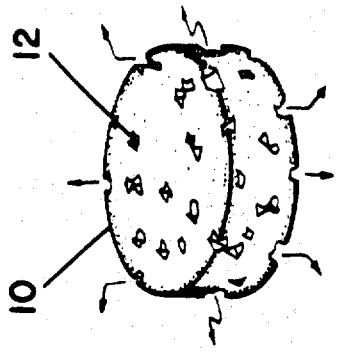
FIGURE 2 is a schematic drawing showing the voids 12 from which the drug is physically leached from the plastic carrier 10 by the gastro-intestinal fluids upon ingestion.
Figure 1:
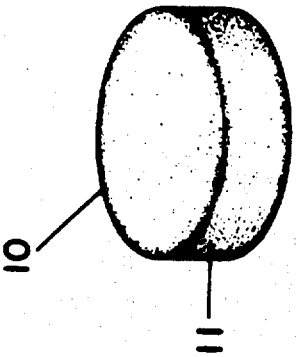
FIGURE 1 is a schematic drawing of a compressed tablet comprising a plastic carrier 10 in which is uniformly dispersed, particles of a solid drug 11.
Figure 4:
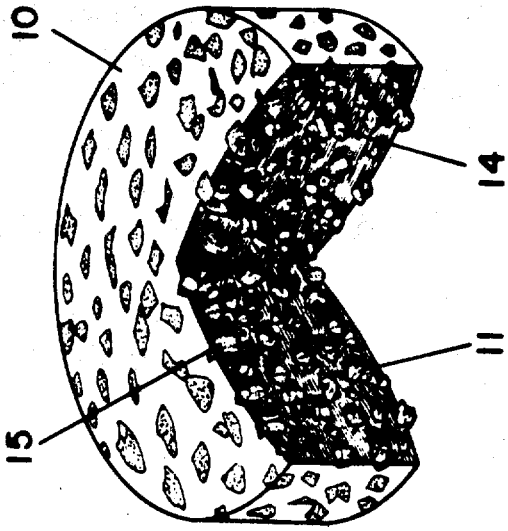
FIGURE 4 is a perspective view of a compressed tablet with parts broken away in cross-sectional showing the plastic carrier 10 and dispersed particles of drug 11. It should be noted that some of the drug particles actually touch each other as illustrated at 14 whereas other particles of drug present on the surface of the plastic carrier as illustrated at 15.

In the accomplishment of the foregoing objects and in accordance with the practice of this invention there is now provided a combination of a drug and, if desired, a water-soluble excipient dispersed uniformly in a body of a non-toxic synthetic plastic material. When such a composition comes into contact with an aqueous liquid the drug is leached out or diffused out of the plastic body. The amount of drug released in the early stages of the leaching out process is sufficient to provide the desired initial pharmacologic response and the amount of drug released thereafter will sustain the pharmacologic response over an extended period of time. Because the releasing action is entirely physical, rather than chemical, the results are readily predictable.

The term "drug" is used herein in its broadest sense as indicating any substance or composition which will give a pharmacologic response. When it is said that the drug is water soluble it is meant to indicate that the drug must be soluble in aqueous liquids to at least a certain small extent but drugs which are readily soluble in water will, of course, make up the preferred group. Methamphetamine salts, hexocyclium methylsulfate, paraamino benzoic acid, ephedrine, mannitol hexanitrate, amphetamine, erythromycin salts, penicillin salts, pentobarbital, phenobarbital, atropine, belladonna, theophylline, sex hormones, hydantoins, trimethadione, water-soluble vitamins such as B and C, benzazoline, toluidine blue O and reated drugs are representative of the broad class of drugs which may be administered in this new composition form.

The plastics to which this invention pertains may be any synthetic resinous or polymeric material which is substantially inert to gastro-intestinal liquids and which, of course, is essentially non-toxic and can be ingested without danger. The plastic mass or body may be referred to as an orally ingestible plastic carrier, in which the drug is dispersed. It is desirable that the drug uniformly dispersed throughout the body or mass of the carrier in order that uniformity of results may be obtained. In a preferred form of the invention it is desirable to use a plastic carrier which is not only substantially water insoluble but which will be excreted substantially unchanged except for the loss of the drug therefrom.

The polymers suitable for use in this invention must be resistant to flow, sintering or "blocking" at temperatures likely to be encountered in storage. While rubbery materials can be used, the manufacture of the finished product is easier if the polymer is hard, i.e., in a glassy or crystalline state at ambient temperature. Since the temperature at which pharmaceutical products may be stored may rise as high as 105° F., the glass point of a suitable polymer should preferably be not much lower than 105° F. The glass point is defined in Flory, "Principles of Polymer Chemistry," p. 56, Cornell University Press, 1953. Briefly, it is the midpoint of the narrow temperature region above which an amorphous polymer exists in a viscous or rubbery condition and below which it is hard and relatively brittle.

There are numerous polymers and copolymers which can be used successfully in this invention as will be evident to those skilled in the art. A few examples are polyethylene, polymethylmethacrylate, copolymers of methylmethacrylate and alkyl acrylates, polyhexamethylene adipamide and the like. The monomers employed to prepare the copolymers may be present in a ratio of from 0–40 to 40–60.

The polymers can be prepared by bulk, solution, suspension, or emulsion polymerization. If the last method is used, the polymer may be coagulated into solid particles which can be readily mixed with a drug or a drug may be admixed before coagulation as will be more fully discussed below.

In the polymerization procedure, it is desirable in some cases to use a step or steps in which impurities, if present, are removed. There should be removed inhibitor, if used, residual monomer or monomers, and any remaining polymerization initiator. Methods for accomplishing these ends are known in the art. They include distillation in various aspects such as distillation with steam or under low pressure, washing and extraction.

The composition of this invention may be described as having discrete particles of a drug dispersed in a matrix of a plastic carrier. This composition is to be distinguished from a plastic tablet coating in which the coating completely surrounds the drug and prevents access of liquids to the drug until the coating is disrupted or destroyed. In the present instance the plastic takes the form of a foraminous body with drug contained in the pockets, so that the drug is accessible to liquids and may be removed from the plastic body by a leaching or washing action without materially affecting the physical condition of the plastic body.

In order to be an effective carrier for the drug the plastic may be permeable to the gastro-intestinal fluids to at least a small extent sufficient to allow leaching out of most of the drug during the time that the plastic is retained by the average person. It should be noted that the degree of water permeability may be low and still be effective. For instance, polyethylene has a very low water permeability, and yet it is satisfactory for use in this invention.

One may add sodium chloride or other water-soluble component or ingredient to increase the water permeability of the composition. Other water-soluble excipients or adjuvants which may be employed include dextrose, acacia, sucrose, polyethylene glycols, sorbitol, urea, polyvinyl-pyrrolidone, inositol, lactose, mannitol, methocel, calcium chloride, pectin and the like.

The new composition of this invention can be made in a number of ways which will be apparent to one skilled in the plastics art. One suitable way of making the composition is to thoroughly blend a plastic powder with the drug in crystalline or granular form and then subject the mixture to heat and pressure so that the plastic is converted into a solid body or mass having the drug dispersed therein. The plastic mass is then ground, shaved or otherwise comminuted into particles of a desired size. Particle size is an important aspect of the invention since the rate of diffusion or leaching out of a drug from a given plastic will be faster from a small particle than it will be from a large particle. It is possible by the use of selected proportions of particles having different sizes to arrive at any desired rate of diffusion or leaching out. This is an important and highly desirable feature since it enables the compounder to adjust the rate of release of the drug to a given set of conditions.

Another method is to disperse the drug in a liquid monomer, and polymerize the mass, thereby achieving an excellent dispersion of the drug in the plastic, which may then be comminuted to desired size. This method may be varied by using mixtures of monomers, and by adding polyfunctional monomers, which result in a cross-linked plastic, insoluble in most solvents. By means of this latter technique, normally water-soluble polymers and very hydrophilic polymers, such as polyacrylic acid, may be employed in the invention.

Still other methods are contemplated. In addition to incorporation of the drug by milling or by mixing and extruding the drug-plastic combination, a drug of limited water solubility may be finely ground and suspended in a latex or aqueous dispersion of an appropriate plastic. The latex may then be coagulated by known procedures to give a finely divided "crumb" in which the plastic and drug are intimately associated. Alternatively, a dispersion or solution of a drug in such a latex may be spray dried or drum dried and the solid product ground and screened to give a suitable prouct. In another method the plastic is dissolved in a solvent solution, the drug is dispersed or dissolved therein and the suspension or solution cast as a film by known techniques. The film can be ground and screened to proper size.

The amount of drug which is suspended or dispersed in the plastic mass may be varied at will from a small but significant amount capable of giving a pharmacologic response up to the saturation point beyond which the composition will no longer have its characteristic properties as a plastic mass. In one instance it was found that up to 90% by weight of drug based on the total weight of the composition can be employed. It will be apparent that the concentration of the drug, the particle size of the composition and the water permeability of the plastic provide a great deal of control over the response of the drug and may be interrelated in such a way as to give the compounder great leeway in the preparation of tailored compositions.

The composition of this invention is preferably administered by grinding or otherwise comminuting the plastic mass having the drug embedded therein to a desired particle size or range of particle sizes and mixing, combining or incorporating in a pharmaceutical carrier. The particles may be recombined with tableting adjuvants in the form of conventional pharmaceutical tablets.

In a preferred method of operation, the individual plastic particles, the drug, and water-soluble excipient may be fused by exposing the compressed tablets to acetone vapor until they become soft and pliable throughout. Upon drying the treated tablet, the plastic forms a network of continuous interstices throughout the tablet which resists disintegration during exposure to water for a considerable length of time. Such acetone treatment may be carried out at room temperature in a closed container for a period of about 24 hours but the process can be accelerated if desired by the use of heat and/or vacuum as described in a copending application.

The following examples are presented in order to provide specific embodiments of the invention in detail. It is not intended, however, that the examples should be a limitation on the invention in any way.

EXAMPLE I

About 50 parts by weight of paraamino benzoic acid and 50 parts by weight of polyethylene are mixed thoroughly and the mixture is pressed into sheets having a thickness between about 35 and 75 mils (thousandths of an inch) by pressing in cauls at 220–260° F. and at an average pressure between 200 and 600 p.s.i. One sample 75 mils in thickness was cut into pieces 1 centimeter in length (393 mils) and 8 mils wide. Another sample 75 mils in thickness was cut into pieces 1 centimeter in length (393) mils and 22 mils wide.

Excretion studies in humans using the described composition 8 mils wide and comparing to paraamino benzoic controls show that 2.1 times as long is required for excretion of 50% of the dose of paraamino benzoic acid from the composition as is required for excretion of 50% of the control dose of the same drug. This rate is substantially independent of the size of the dose.

With the composition 22 mils wide (by 75 x 393 mils) 2.8 to 3.0 times as long is required for excretion or 50% of the dose of paraamino benzoic acid therefrom as is required for excretion of 50% of the control dose. This finding bears out the theory that particle size is an important factor in the rate of release of the drug from the plastic; the rate of release being inversely proportional to the size of the particle.

The 8 mils material (by 75 x 393 mils) had approximately 2.75 times the surface area of the 22 mils material (by 75 x 393 mils) for an equal weight, and released about 3.1 times as much paraamino benzoic acid in water in six minutes as did the 22 mils material.

Example II

Tablets are prepared according to the following directions, the amounts of each component being on a per tablet basis:

| | Mg. |
|---|---|
| Methamphetamine hydrochloride | 5.00 |
| Polyvinylpyrrolidone | 26.41 |
| Methylacrylate-methylmethacrylate copolymer (30 mesh) | 77.37 |
| Talc | 5.36 |
| Magnesium stearate | 2.50 |

Mix the methamphetamine hydrochloride with the polyvinylpyrrolidone and mill through a hammermill using a 30-mesh screen. Charge this mix with the plastic, talc and magnesium stearate into a blender and blend well. Compress into tablets and fuse by heating or exposing said tablets to acetone vapor.

Example III 75 mg. of a plastic composition consisting of polyethylene particles having 20% by weight of methamphetamine dispersed therein is placed in a small hard-gelatin capsule suitable for administration to a human host.

Example IV

A mixture comprising 10% methamphetamine and 90% granular polyethylene is ball milled and dried. The mixture is compression molded in sheets about 5 inches squa and to varying thicknesses on a 6 x 6 Carver press (10,00 p.s.i. on 1¼ inch ram at 130° C. for 2 minutes). Simil samples were made in like manner using 20% methan phetamine with 80% polyethylene, and 40% metha phetamine with 60% polyethylene. In general it may b said that the release of drug out of these compositions directly proportional to the concentration of drug an inversely proportional to the particle size of the materi obtained by comminuting the aforementioned sheets.

Example V

A mixture comprising 10% methamphetamine an 90% of a 1:1 copolymer of methylmethacrylate-methy acrylate is thoroughly blended and compressed on th Carver press (see Example IV) at 150° C. for 3 minute Similar samples were made in like manner using 20 methamphetamine and 80% of said copolymer, and 40 methamphetamine and 60% copolymer. The release c drug from particles obtained by comminuting the sample follows the general pattern stated in Example IV.

Example VI

A rod was extruded from a 1 inch National Rubber Ma chinery Co. extruder at temperatures between 285 an 335° F. The material was a blend of 40% methamphet mine, 59% polyethylene and 1% stearic acid. This ro is comminuted to small particle size and the produc showed the same drug release as in Example IV.

Example VII

Tablets are prepared according to the following direc tions by employing the amounts of the following ingredi ents on a per tablet basis:

| | Mg |
|---|---|
| Methamphetamine hydrochloride | 15.0 |
| Polyvinylpyrrolidone | 14.0 |
| Yellow lake dye | 0.0 |
| Talc | 4.6 |
| Methylacrylate-methylmethacrylate copolymer (80 mesh) | 19.8 |
| Methacrylate - methylmethacrylate copolymer (30 mesh) | 60.6 |
| Magnesium stearate | 2.4 |

Mix the methamphetamine hydrochloride with the poly vinylpyrrolidone and mill through a hammermill using 30-mesh screen. Mix the dye with part of the talc an hammermill through a 60-mesh screen. Charge both o the above mixes with all of the plastic, magnesium stearat and the balance of the talc into a blender and blend well Compress into tablets and fuse said tablets by heating o exposing to acetone vapor. The drug release pattern o this formulation is similar to the curve shown in FIG URE 5.

Example VIII

A formulation was prepared employing the followin components, the amounts of each component being on per tablet basis:

| | Mg |
|---|---|
| Hexocyclium methylsulfate | 50.0 |
| Methylacrylate-methylmethacrylate copolymer (20 mesh) | 48.4 |
| Talc | 5.2 |
| Magnesium stearate | 0.4 |

Thoroughly blend the plastic and hexocyclium methyl sulfate. Then add the talc and magnesium stearate, blen for 45 minutes, compress into tablets and fuse the tablet be exposure to acetone vapor. The drug will be release gradually over an 8 to 12 hour period after a tablet i ingested.

Example IX

Another formulation was prepared as shown below ıerein all ingredients and amounts are on a per tablet sis:

| | Mg. |
|---|---|
| :xocyclium methylsulfate | 50.0 |
| ıenobarbital sodium | 33.0 |
| ırbowax 6000 | 22.0 |
| ethylacrylate-methylmethacrylate copolymer | 54.0 |
| ılc | 8.5 |
| agnesium stearate | 2.1 |

The ingredients are all charged into a suitable blender d mixed well. The mixture is then passed through a -mesh screen and reblended followed by compression :o tablets. The drug in this composition will be released ıwly over a period of 8 hours after oral administration one tablet.

Example X

A tablet was prepared having the following compo- nts:

| | Mg. |
|---|---|
| ethamphetamine hydrochloride | 15.0 |
| ıntobarbital calcium | 90.0 |
| ethylacrylate - methylmethacrylate copolymer (80 mesh) | 9.5 |
| ılcium chloride | 4.8 |
| ılc | 9.3 |
| agnesium stearate | 4.6 |

The methamphetamine hydrochloride, pentobarbital lcium and calcium chloride are passed through a 40- esh screen and blended. The plastic is dissolved in ace- ne and added to the above mixture. The acetone is aporated and the remaining solids are ground to pass rough a 20-mesh screen. Talc and magnesium stearate e added and the entire mixture blended well before com- essing into tablets which are thereafter exposed to ace- ne vapor for one hour at 105° F. Such tablets release : drugs contained therein according to the pattern illus- ıted in FIGURE 5.

Example XI

Tablets were prepared containing the following ingre- :nts by weight:

| | Mg. |
|---|---|
| perazine tartrate | 209 |
| ethylacrylate - methylmethacrylate copolymer (80 mesh) | 104 |
| ılc | 12 |
| agnesium stearate | 3 |

Blend all the ingredients and pass through a 40-mesh reen. Compress the mixture into slugs and grind the ıgs first through a 4-mesh screen and then through a -mesh screen. Blend well and compress into tablets. ıe release pattern of these tablets is as shown in FIG- RE 5.

Example XII

A tablet was prepared as described in Example XI con- ining the following amounts of each component listed.

| | Mg. |
|---|---|
| icotinic acid | 400 |
| ethylacrylate-methylmethacrylate copolymer (80 mesh) | 100 |
| ılc | 20 |
| agnesium stearate | 5 |

Upon ingestion of such a tablet, the nicotinic acid is adually released from the plastic over a period of 8 ıurs.

Example XIII

By employing the procedure of Example XI, tablets were prepared containing the following ingredients in the amounts specified.

| | Mg. |
|---|---|
| Phenobarbital sodium | 72 |
| Methylacrylate - methylmethacrylate copolymer (80 mesh) | 72 |
| Talc | 5.7 |
| Magnesium stearate | 1.4 |

Figure 5:
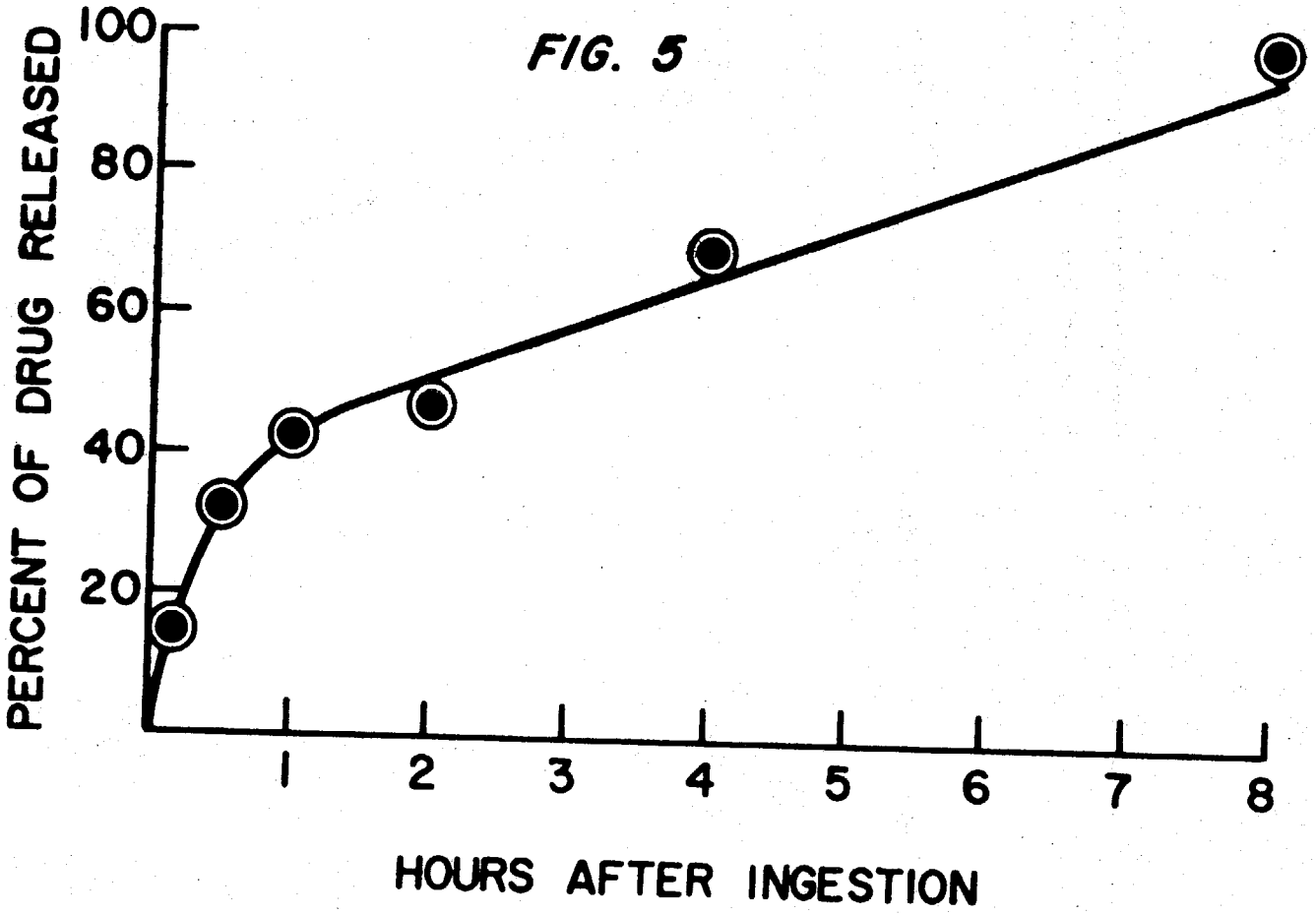
FIGURE 5 is a graph showing the cumulative amount of drug released over a period of eight hours after ingestion.

These tablets release the phenobarbital according to the pattern illustrated in FIGURE 5 when such tablets are orally ingested.

Example XIV

The following components are mixed and compressed into tablets by methods previously described. The amounts given are on a per tablet basis:

| | Mg. |
|---|---|
| Nicotinamide | 20 |
| Thiamine mononitrate | 3 |
| Pyridoxine hydrochloride | 0.5 |
| Calcium pantothenate | 5 |
| Sodium ascorbate | 50 |
| Vitamin $B_{12}$ | .002 |
| Methylacrylate-methylmethacrylate copolymer (80 mesh) | 50 |
| Talc | 2.8 |
| Magnesium stearate | 1.4 |

The vitamins in this formulation are slowly leached from the plastic carrier over an extended period of about 12 hours after a tablet is orally administered.

Other water-soluble excipients and other plastics heretofore enumerated may be substituted in the foregoing formulations with equally effective results as regards the release of the drug from the plastic carrier over an extended period of time.

This application is a continuation-in-part of my copending application Serial No. 533,504, filed September 9, 1955 now abandoned.

Others may practice this invention in any of the numerous ways which will be suggested to one skilled in the art upon a reading of this disclosure. All such practice of the invention is considered to be a part thereof provided it falls within the scope of the appended claims.

I claim:

1. A composition in oral dosage form which comprises (a) a porous plastic matrix which is substantially inert to gastro-intestinal fluidss, said plastic being permeable to the water component of gastro-intestinal fluids to at least a small extent and being selected from the group consisting of crystalline polymers having a melting point of at least about 105° F. and amorphous polymers having a glass point of at least about 105° F. and (b) an amount of a water soluble drug sufficient to give a pharmacologic response upon ingestion and absorption, said drug being uniformly dispersed within the pores of said plastic matrix and said composition adapted to release an effective amount of the drug gradually over a period of time during which the dosage form is present in the body.

2. A composition in tablet form which comprises (a) a porous plastic matrix which is substantially inert to gastro-intestinal fluids, said plastic being permeable to the water component of gastro-intestinal fluids to at least a small extent and being selected from the group consisting of crystalline polymers having a melting point of at least about 105° F. and amorphous polymers having a glass point of at least about 105° F. and (b) 10 to 90 parts by weight of a water soluble drug, said drug being uniformly dispersed within the pores of said plastic matrix and said tablet adapted to release an effective amount of the drug gradually over a period of time during which the tablet is present in the body.

3. A tablet as claimed in claim 2 in which plastic particles and drug particles are blended and the resulting blend is compressed into tablets.

4. A tablet as claimed in claim 2 to which is added a water soluble excipient.

5. A tablet as claimed in claim 2 which comprises about 30 parts by weight of a water soluble drug and about 70 parts by weight of an amorphous polymer having a glass point of at least about 105° F.

6. A tablet as claimed in claim 2 which comprises from about 10 to 90 parts by weight of a water soluble drug and the plastic is a methylacrylate-methylmethacrylate copolymer, said copolymer being present in an amount of from about 90 to 7 parts by weight of the tablet.

7. A tablet as claimed in claim 2 which comprises about 50 parts by weight of a water soluble drug and about 50 parts by weight of a methylacrylate-methylmethacrylate copolymer.

8. A tablet as claimed in claim 2 which comprises from about 10 to 90 parts by weight of a water soluble drug and the plastic is polyethylene which is present in an amount of about 90 to 7 parts by weight of the tablet.

9. A tablet as claimed in claim 2 which comprises about 30 parts by weight of a water soluble drug and about 70 parts by weight of polyethylene.

10. A tablet as claimed in claim 2 in which the drug is methamphetamine.

11. A tablet as claimed in claim 2 in which the drug is hexocyclium methylsulfate.

12. The method of making an oral dosage form which comprises blending (a) from about 10 to 90 parts by weight of a finely divided water soluble drug with (b) from about 90 to 10 parts by weight of a plastic which is substantially inert to gastro-intestinal fluids but permeable to the water component of gastro-intestinal fluids to at least a small extent, said plastic being selected from the group consisting of crystalline polymers having a melting point of at least about 105° F. and amorphous polymers having a glass point of at least about 105° F. and compressing said blended mixture into a tablet having said drug uniformly dispersed therein.

13. The method of treating the human body which comprises administering to a human host a tablet comprising (a) a porous plastic matrix which is substantially inert a gastro-intestinal fluids, said plastic being permeable to the water component of said fluids to at least a small extent and being selected from the group consisting of crystalline polymers having a melting point of at least about 105° F. and amorphous polymers having a glass point of at least about 105° F. and (b) an amount of a water soluble drug sufficient to give a pharmacologic response upon ingestion and absorption, said drug being uniformly dispersed within the pores of said plastic matrix and said tablet adapted to release an effective amount of the drug gradually over a period of time during which the table is present in the body.

14. The method as claimed in claim 13 in which the tablet administered comprises from about 10 to 90 parts by weight of a water soluble drug uniformly dispersed in the pores of a methylacrylate-methylmethacrylate copolymer.

*15. A dosage form wherein an amount of drug released in the early stages of the leaching out process is sufficient to provide the desired initial pharmacologic response, and which will release an effective amount of the drug within a short time after ingestion in accordance with claim 1 wherein some particles of the drug are present on the surface of said dosage form.*

*16. A dosage form wherein an amount of drug released after said initial pharmacologic response is sufficient to sustain the initial pharmacologic response over a desired period of time in accordance with claim 15 wherein some particles of the drug touch each other.*

*17. A tablet form wherein an amount of drug released in the early stages of the leaching out process is sufficient to provide the desired initial pharmacologic response, and which will release an effective amount of the drug within a short time after ingestion in accordance with claim 2 wherein some particles of the drug are present on the surface of said tablet form.*

*18. A tablet form wherein an amount of drug released after said initial pharmacologic response is sufficient to sustain the initial pharmacologic response over a desired period of time in accordance with claim 17 wherein some particles of the drug touch each other.*

*19. A tablet form wherein an amount of drug released in the early stages of the leaching out process is sufficient to provide the desired initial pharmacologic response, and which will release an effective amount of the drug within a short time after ingestion in accordance with claim 6 wherein some particles of the drug are present on the surface of said tablet form.*

*20. A tablet form wherein an amount of drug released after said initial pharmacologic response is sufficient to sustain the initial pharmacologic response over a desired period of time in accordance with claim 19 wherein some particles of the drug touch each other.*

*21. A tablet form wherein an amount of drug released in the early stages of the leaching out process is sufficient to provide the desired initial pharmacologic response, and which will release an effective amount of the drug within a short time after ingestion in accordance with claim 7 wherein some particles of the drug are present on the surface of said tablet form.*

*22. A tablet form wherein an amount of drug released after said initial pharmacologic response is sufficient to sustain the initial pharmacologic response over a desired period of time in accordance with claim 21 wherein some particles of the drug touch each other.*

*23. A tablet form wherein an amount of drug released in the early stages of the leaching out process is sufficient to provide the desired initial pharmacologic response, and which will release an effective amount of the drug within a short time after ingestion in accordance with claim 8 wherein some particles of the drug are present on the surface of said tablet form.*

*24. A tablet form wherein an amount of drug released after said initial pharmacologic response is sufficient to sustain the initial pharmacologic response over a desired period of time in accordance with claim 23 wherein some particles of the drug touch each other.*

*25. A tablet form wherein an amount of drug released in the early stages of the leaching out process is sufficient to provide the desired initial pharmacologic response, and which will release an effective amount of the drug within a short time after ingestion in accordance with claim 9 wherein some particles of the drug are present on the surface of said tablet form.*

*26. A tablet form wherein an amount of drug released after said initial pharmacologic response is sufficient to sustain the initial pharmacologic response over a desired period of time in accordance with claim 25 wherein some particles of the drug touch each other.*

*27. A method in accordance with claim 12 wherein some particles of the finely divided water soluble drug are provided on the surface of said oral dosage form.*

*28. A method in accordance with claim 27 wherein some particles of the finely divided water soluble drug touch each other in said oral dosage form.*

*29. A method in accordance with claim 12 wherein said tablet is fused by exposing the compound tablets to acetone vapor until they become soft and pliable throughout, and drying the thus-treated tablet.*

*30. An oral dosage form in accordance with claim 1 in particulate form resulting from comminution of said porous plastic matrix having said drug uniformly dispersed within the pores.*

*31. An oral dosage in accordance with claim 30 wherein said oral dosage form in particulate form is contained in a gelatine capsule.*

*32. A tablet form in accordance with claim 2 in which said porous plastic matrix contains a network of continu-*

*interstices throughout the tablet which resist disin-*
*ation during exposure to water.*

References Cited

'he following references, cited by the Examiner, are
'ecord in the patented file of this patent or the original
ent.

UNITED STATES PATENTS

| | | | |
|---|---|---|---|
| 478,182 | 8/1949 | Consolazio | 424—22X |
| 702,264 | 2/1955 | Klaui | 424—22X |
| 305,977 | 9/1957 | Robinson | 424—22X |
| 320,741 | 1/1958 | Endicott | 424—22X |

FOREIGN PATENTS

| | | |
|---|---|---|
| 217,287 | 9/1958 | Australia. |
| 530,439 | 10/1949 | Great Britain. |

OTHER REFERENCES

Journal of the American Pharmaceutical Assoc., October 1954, pages 591–592.

The Merck Index, 6th edition, 1952, pages 314–315.

Physicians Desk Reference, 1955, Ninth Ed., page 524.

Modern Plastic Encyclopedia Issue, September 1954, published by Breskin Publications, Inc., 575 Madison Ave., N.Y. 22, N.Y., pp. 1, 805, 806, 807, 808, 809.

Micciche: "Preparation of Orally Administered Medicaments With Predictable Retarded Effect," in Pharmaceutical Chemical Bulletin, Milan, Italy, vol. 94, pp. 485–493 (1955), in Italian: abstracted in English in Chem. Abstracts, vol. 50, No. 7, #5242*g*, April 10, 1956, Official Patent Office translation from the Italian article, FHB–6–20–60, pp. 1–16.

SHEP K. ROSE, Primary Examiner